(12) United States Patent
Lundy et al.

(10) Patent No.: US 7,814,145 B2
(45) Date of Patent: Oct. 12, 2010

(54) SYSTEM, METHOD, APPARATUS, AND COMPUTER MEDIA FOR DISTRIBUTING TARGETED ALERTS

(76) Inventors: Shane Lundy, 3 Arch Pl., No. 130, Gaithersburg, MD (US) 20878; Yossi Firstenberg, 70 Rollins Ct., Rockville, MD (US) 20852

( * ) Notice: Subject to any disclaimer, the term of this patent is extended or adjusted under 35 U.S.C. 154(b) by 0 days.

(21) Appl. No.: 11/844,486

(22) Filed: Aug. 24, 2007

(65) Prior Publication Data

US 2008/0092162 A1    Apr. 17, 2008

Related U.S. Application Data

(60) Provisional application No. 60/849,445, filed on Oct. 5, 2006, provisional application No. 60/839,683, filed on Aug. 24, 2006.

(51) Int. Cl.
*G06F 15/16* (2006.01)
*H04N 7/10* (2006.01)

(52) U.S. Cl. .................. 709/203; 709/201; 709/202; 709/227; 709/228; 709/229; 725/32; 725/33; 725/34; 725/35; 725/36

(58) Field of Classification Search ............... 709/228, 709/201, 202, 203; 725/32–36
See application file for complete search history.

(56) References Cited

U.S. PATENT DOCUMENTS

| | | | |
|---|---|---|---|
| 6,018,699 A * | 1/2000 | Baron et al. | 702/3 |
| 6,177,873 B1 * | 1/2001 | Cragun | 340/601 |
| 7,080,018 B1 * | 7/2006 | Fox et al. | 705/1 |
| 7,212,922 B1 * | 5/2007 | Longacre et al. | 702/3 |
| 2002/0130899 A1 * | 9/2002 | Ryan et al. | 345/738 |
| 2006/0282312 A1 * | 12/2006 | Carlson et al. | 705/14 |

OTHER PUBLICATIONS

Diad, "Alert real-time weather monitoring and flood warning"; Sep. 20, 2000.*

* cited by examiner

*Primary Examiner*—Vivek Srivastava
*Assistant Examiner*—Lin Liu
(74) *Attorney, Agent, or Firm*—Oblon, Spivak, McClelland, Maier & Neustadt, L.L.P.

(57) ABSTRACT

A method of presenting content, including steps of: determining a location associated with a user; receiving notice of a dynamic content alert (DCA); creating an advertisement that includes real-time information related to the dynamic content being within a predetermined range of the location associated with the user; and presenting the advertisement to the user.

20 Claims, 17 Drawing Sheets

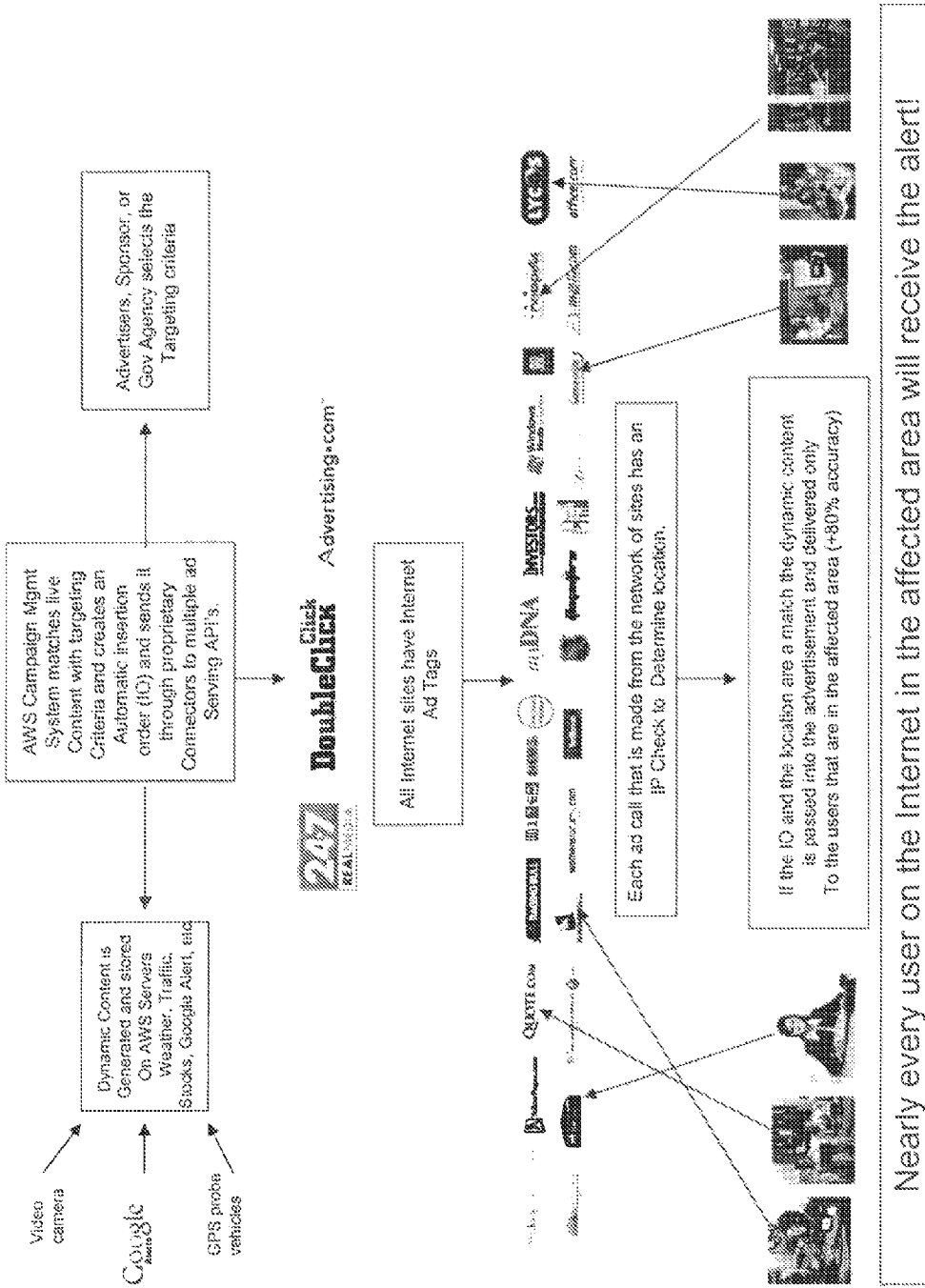

Each end user that is visiting a site in the network, in the affected area will see the alert.

When the end user clicks the alert, they will be linked to a site that has the detailed alert information and any additional information about the sponsor.

SYSTEM, METHOD, APPARATUS, AND COMPUTER MEDIA FOR DISTRIBUTING TARGETED ALERTS

CROSS-REFERENCE TO RELATED APPLICATIONS

This application is based upon and claims the benefit of priority under 35 U.S.C. §119(e) for U.S. Ser. Nos. 60/849,445, filed on Oct. 5, 2006 and 60/839,683, filed on Aug. 24, 2006, the entire contents of each of which are incorporated herein by reference.

BACKGROUND OF THE INVENTION

1. Field of the Invention

The present invention relates to a method, system, apparatus, and computer program product for distributing Dynamic Content Alerts (DCA) to end users that are consuming IP enabled content. Dynamic Content Alerts includes, but is not limited to, weather conditions, forecast, NWS Alerts, Amber Alerts, DHS Alerts, FEMA Alerts, Traffic Incidents, Traffic Conditions, Traffic Forecast, Sports Scores, Stock Information, News, etc. The DCA will be from 1 second to 15 minutes to get to the end user.

2. Description of the Related Art

Consumer behavior has changed extensively over the last 30+ years, as shown by the graph in FIG. 1. The graph in FIG. 1 shows information consumption patterns, by medium, as a percent of market share, for the period 1970-2005. In the 1970's, consumers obtained information from television, radio, and telephone. Furthermore, information consumption patters for these media have remained constant over the last 35 years, as shown in FIG. 1. However, technology has been rapidly expanding over the last 35 years, and new media have been consistently emerging. These new media include cable (1980's), cell phone (1990's), internet (1990's), and broadband (2005).

The Emergency Broadcast System (EBS) historically was used to relay information to consumers via radio and television. In 1994, EBS was replaced by the Emergency Alert System (EAS). EAS is the test script occasionally heard on broadcast stations or local cable systems.

Since Jan. 1, 1997, all AM, FM and TV broadcast stations have been using the EAS. Also, since Dec. 31, 1998, cable systems that have 10,000 or more subscribers are part of the EAS.

The EAS uses digital technology to distribute messages. This allows for many improvements in providing emergency information to the public. The EAS system provides state and local officials with a method to quickly send out important local emergency information targeted to a specific area. The information can be sent out through a broadcast station and cable system even if those facilities are unattended. Also, the EAS digital signal is the same signal that the National Weather Service (NWS) uses on NOAA Weather Radio (NWR). This allows NWR signals to be decoded by the EAS equipment at broadcast stations and cable systems. Broadcasters and cable operators can then retransmit NWS weather warning messages almost immediately to their audiences.

However, with the diversity in information consumption patterns that exists today, EAS is no longer an effective program.

Internet advertising, when compared to convention television and radio advertising, brings with it its own distinct advantages and set of rules for success. The Internet, as an advertising medium, scores over the conventional media on two counts:

In its ability to provide for interactive communication where the advertiser can establish, a two-way communication with the consumer.

In its ability to target communication to a specific target segment.

FIG. 13 shows an example of a background scheme of combining content with advertisements. In the example of FIG. 13, content provider A 1806: makes available two types of content over the Internet 1804. In particular, content provider A 1806 makes available content A programmed for advertisements X 1814 and content A2 programmed for advertisements Y 1816. Similarly, content provider B 1808 makes available content B programmed for advertisements X 1818 and content B programmed for advertisements Y 1820. Further in the example of FIG. 13, advertising aggregator 1810 provides plural types of advertising, for example advertisements X1 1822 and advertisements X2 1824. In addition, advertising aggregator Y 1812 provides advertisements Y1 1826 and advertisements Y2 1828.

Further, in this example, content is displayed on, or presented from a user interface 1802, after it is retrieved over the Internet 1804. For example, if a user requests content A from content provider A, content A programmed for advertisements X 1814 may be sent to a user interface available to the user. In addition, the content A is programmed to cause the user interface to also retrieve advertisements X from advertising aggregator X 1810. Thus, the user interface 1802 may also request advertisement A from advertising aggregator X. Upon receipt of a request for advertisements X, advertising aggregator X 1810 makes a decision to provide at least one of advertisements X1 1822 and advertisements X2 1824 to the user making that request. Thus, in the present example, content on user interface 1802 is displayed as content A plus the advertisement selected by advertisement aggregator X. Alternatively, upon receipt of request for content A by content provider A 1806, content provider A 1806 may choose to send content A programmed for advertisements Y 1816 and subsequently advertising aggregator Y 1812, upon receiving a request for advertisements from the user interface of the user may choose to send advertisements Y1 1820 or advertisements Y2 1828. Thus, in this background example, the user interface 1802 displays or presents a combination of the content requested by the user plus an advertisement selected by the content provider and/or an advertising aggregator.

Thus, in the background scheme of FIG. 13, the selection or advertisements to be displayed with content is made by parties other than the user and therefore the advertising is less effective and the user experience is diminished.

Other background schemes have attempted to address this problem by making an advertisement selection based on general selection information collected about or from the user.

These background schemes discussed above cannot provide dynamic real-time information to consumers. The system shown in FIG. 13 has pre-formatted advertisements Y1, Y2, X1, and X2. There is no mechanism in place to combine dynamic real-time information (i.e., an alert for a tornado warning) with an advertisement, so as to provide the dynamic real-time information to a large audience in a relevant area.

Furthermore, other conventional schemes have communicated information, such as school closures, via email to registered users. However, such a system may provide information to a small audience, and the information provided is not real-time information. Further, such systems require that users check their email to receive the information. The present inventors recognize that emailing emergency alert notices would not be as effective as providing real-time alerts.

SUMMARY OF THE INVENTION

The present invention is directed to address the above-identified and other limitations with conventional systems.

In one exemplary embodiment, a method of presenting content, includes: determining a location associated with a user; receiving notice of a dynamic content alert (DCA); creating an advertisement that includes real-time information related to the dynamic content being within a predetermined range of the location associated with the user; and presenting the advertisement to the user.

In another exemplary embodiment, a method presenting content, includes: obtaining dynamic real-time information when a predetermined condition is satisfied; including the dynamic real-time information in an advertisement; accessing a database that stores sponsor information in correspondence with a characteristic of the dynamic real-time information; determining, based on information stored in the database, which sponsor corresponds with the dynamic real-time information; including the sponsor in the advertisement; and presenting the advertisement to a user.

In another exemplary embodiment, a system for presenting content, includes: means for determining a location associated with a user; means for receiving notice of a dynamic content alert (DCA); means for creating an advertisement that includes real-time information related to the dynamic content being within a predetermined range of the location associated with the user; and means for presenting the advertisement to the user.

In another exemplary embodiment, a system for presenting content, includes: means for obtaining dynamic real-time information when a predetermined condition is satisfied; means for including the dynamic real-time information in an advertisement; means for accessing a database that stores sponsor information in correspondence with a characteristic of the dynamic real-time information; means for determining, based on information stored in the database, which sponsor corresponds with the dynamic real-time information; means for including the sponsor in the advertisement; and means for presenting the advertisement to a user.

In another exemplary embodiment, a computer readable storage medium encoded with instructions, which when executed by a computer, causes the computer to implement a method of presenting content, including: determining a location associated with a user; receiving notice of a dynamic content alert (DCA); creating an advertisement that includes real-time information related to the dynamic content being within a predetermined range of the location associated with the user; and presenting the advertisement to the user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2C shows a flow chart for an embodiment of the invention;

DETAILED DESCRIPTION OF THE PREFERRED EMBODIMENTS

Figure 1:
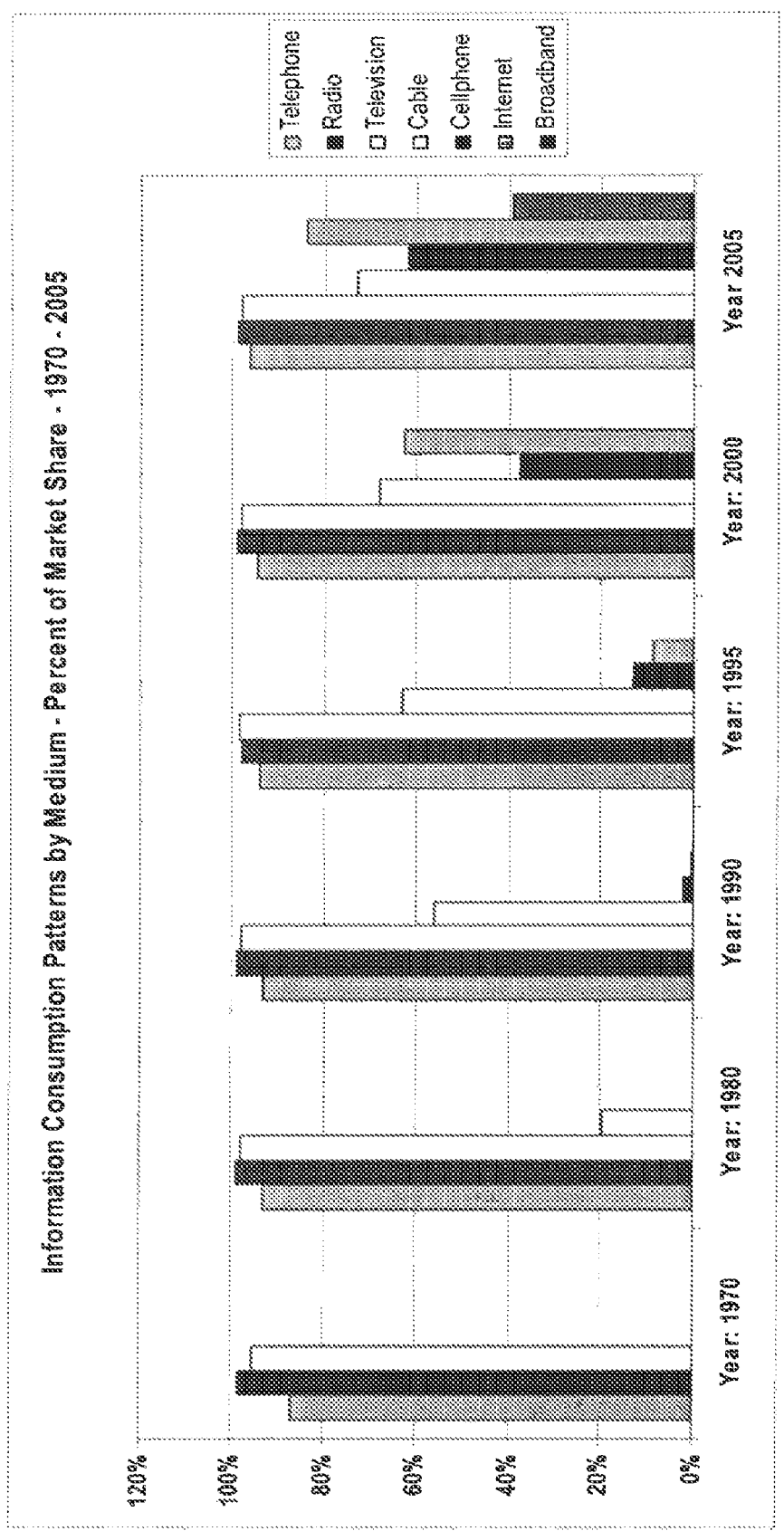
FIG. 1 shows a graph of information consumption patterns by medium.
Figure 2A:
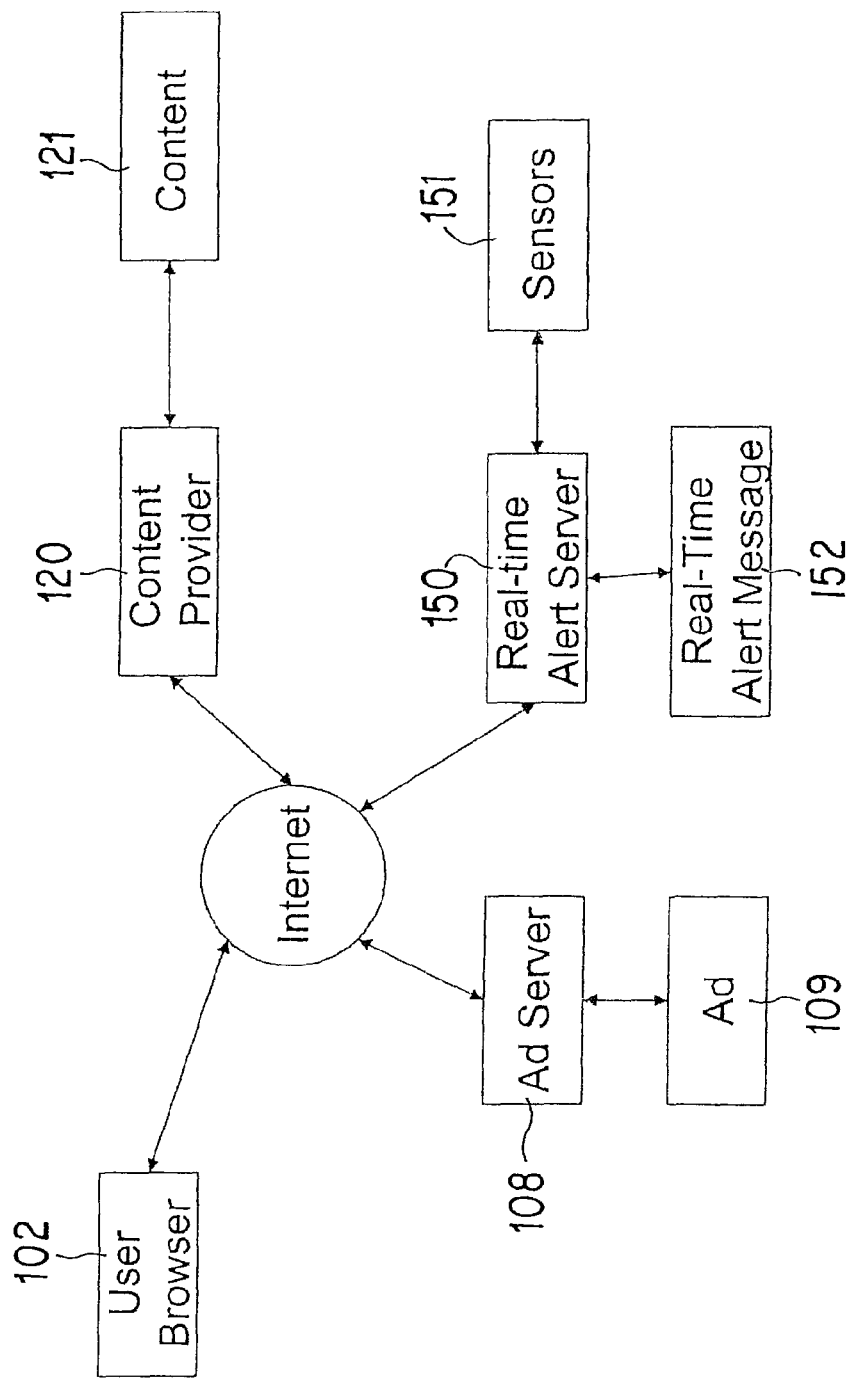
FIG. 2A shows an exemplary embodiment of a system of the present invention.

Referring now to the drawings, wherein like reference numerals designate identical or corresponding parts throughout the several views, and more particularly to FIG. 2A thereof, which shows an example of a system for providing alerts to Internet users.

A user (not shown) uses browser 102 to connect to the Internet. Browser 102 sends a request to content provider 120. Content provider 120, in response to the request, constructs a web page including content 121 and ad tags. Ad server 108 uses the ad tags to insert ad 109 into content 121 by providing ad 109 to browser 102. However, if predetermined conditions are met (i.e., DCA server 150 detects the occurrence of an event through sensors 151) DCA server 150 sends an automatic insertion order to ad server 108. The automatic insertion order causes the ad server to add DCA message 152 to ad 109. Alternatively, DCA message may be added to a new custom advertisement.

In another embodiment of the present invention, the ad server 108 will dynamically create the advertisement as a result of the nature of the alert, rather than use an advertisement that was prefabricated. For example, in the context of a weather event, if sensors 151 detect a rain storm, ad server 108 will analyze the sensor data and dynamically construct an ad for rain tires.

Server 150 stores and generates dynamic content. Dynamic content includes, but is not limited to, weather information, traffic information, stock market information, sports information, news, DHS, Amber and FEMA alerts, etc. Dynamic content can be presented in any format including, but not limited to, text, graphics, audio, or video. The system shown in FIG. 2A matches dynamic content and creates an automatic insertion order. The automatic insertion order is a script, which when executed, determines if a DCA is displayed to a user via an advertisement. The automatic insertion order is sent through multiple ad serving application program interfaces.

A new ad will be generated and served when the user performs an action on the website that causes the page to refresh and serve new advertising.

Each ad call results in a call to the DCA server, which performs an IP check to determine a location of the user. A person of ordinary skill in the art knows how to determine a physical location from an IP address, and further explanation will not be provided. If the automatic insertion order previously stored on the real-time alert server 150 and the location are a match, dynamic content identified by the real-time alert server is passed into the advertisement and delivered to the user. For example, if the real-time information indicates there is a severe thunderstorm warning for zip code 20878, the automatic insertion order may include a script that performs the following logical operation: if the user is located in zip code 20878, then display an advertisement that includes the thunderstorm warning (including dynamic real-time information). Then, if the IP check determines that the user is in zip code 20878, an advertisement on a webpage the user is viewing includes the above-noted advertisement and alert regarding the thunderstorm.

Prior user registration is not always required. However, another embodiment of the present invention relates to dynamic alerting based on end user preferences. End user preference registration could be registered on any site that is delivering alerts that allow end user preferences for delivery such as email, sms, phone, and in the future DCA An embodiment of the system includes a dynamic content targeting module, that interfaces with third party ad servers, such as OAS and DoubleClick. Then, if certain conditions are satisfied (i.e., if the weather conditions, forecast alerts, etc. are met and there is a user on one of these sites that there is a partnership with) then dynamic real-time content may be displayed to a user in an affected area through a webpage advertisement.

Figure 3:
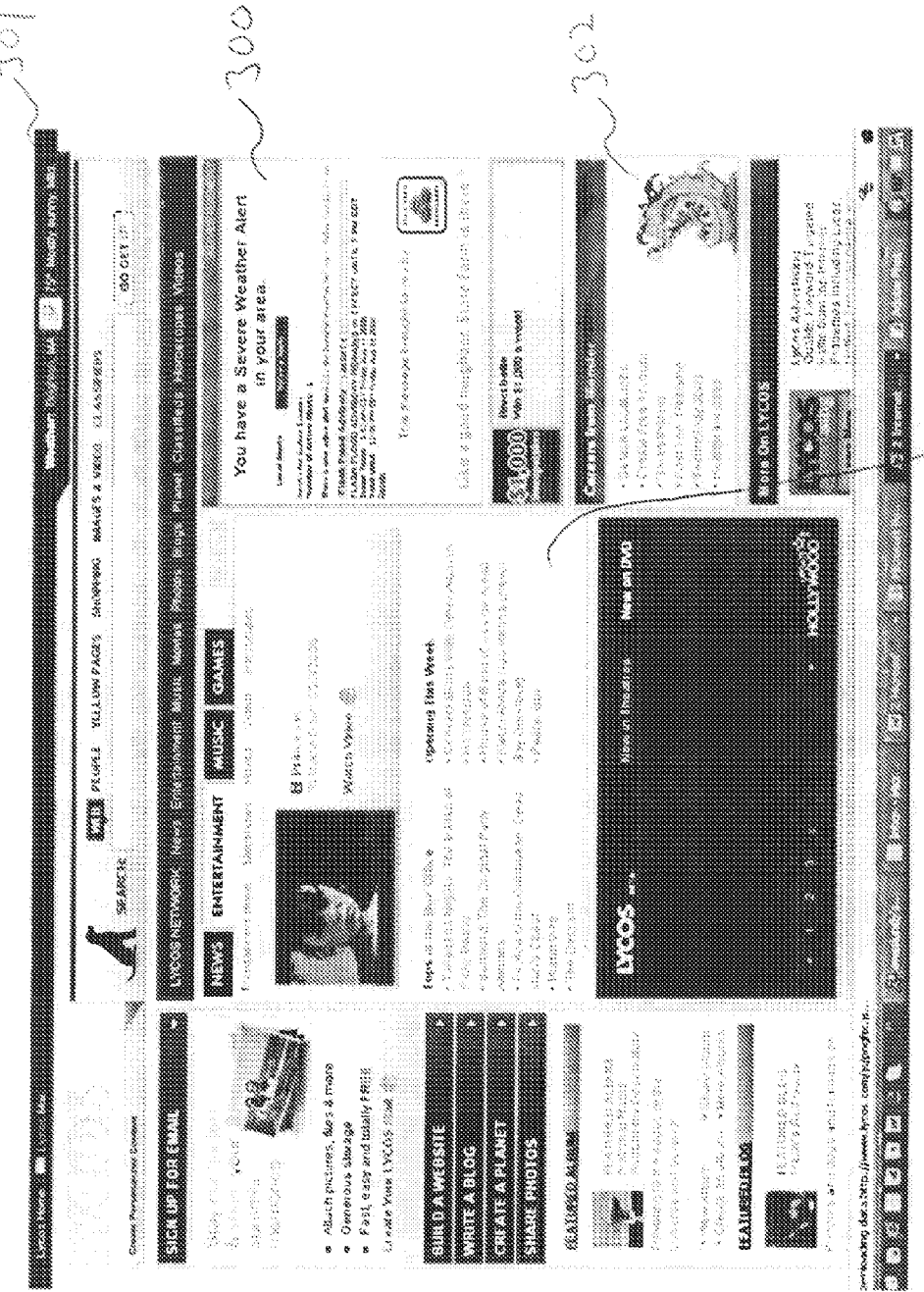
FIG. 3 is a screen shot of a web page that includes an exemplary targeted alert of the present invention.
Figure 4:
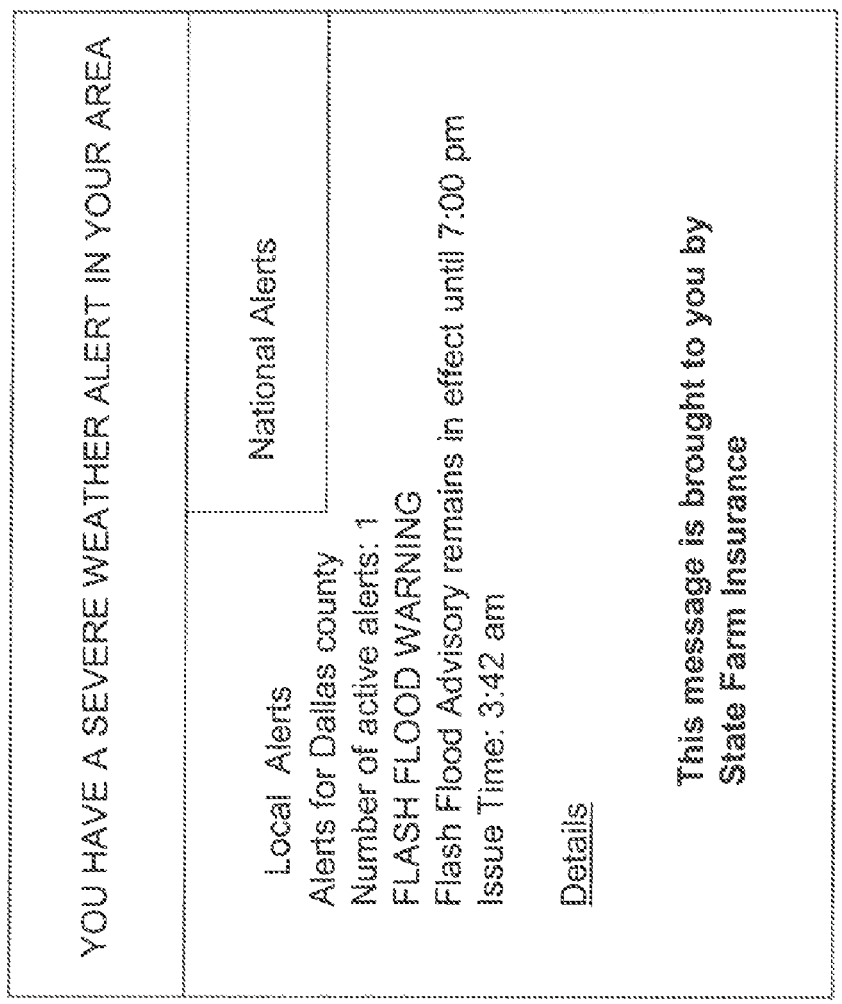
FIG. 4 is an exemplary targeted alert shown in the web page of FIG. 3.

FIG. 3 is a screen shot of a web page that includes an alert message in accordance with an embodiment of the present invention. In this example, web page 301 includes content 304 supplied by Lycos™ and advertisements 302 supplied by Monster.com™ 302. IFrame 300 includes dynamic real-time information and sponsor information, in accordance with the present invention. In this example, there is a severe weather alert in the geographic area of the user that retrieves the web page 300, as indicated by the inserted message "You have a severe weather alert in your area. This message is brought to you by State Farm." FIG. 4 is an example of the advertisement that includes alert message. As shown in FIG. 4, the alert message includes sponsor information by State Farm™ and information about the severe weather alert.

FIG. 2C shows a flow chart of the interactions between the components such as those shown in the embodiment of FIG. 2A.

Figure 2B:
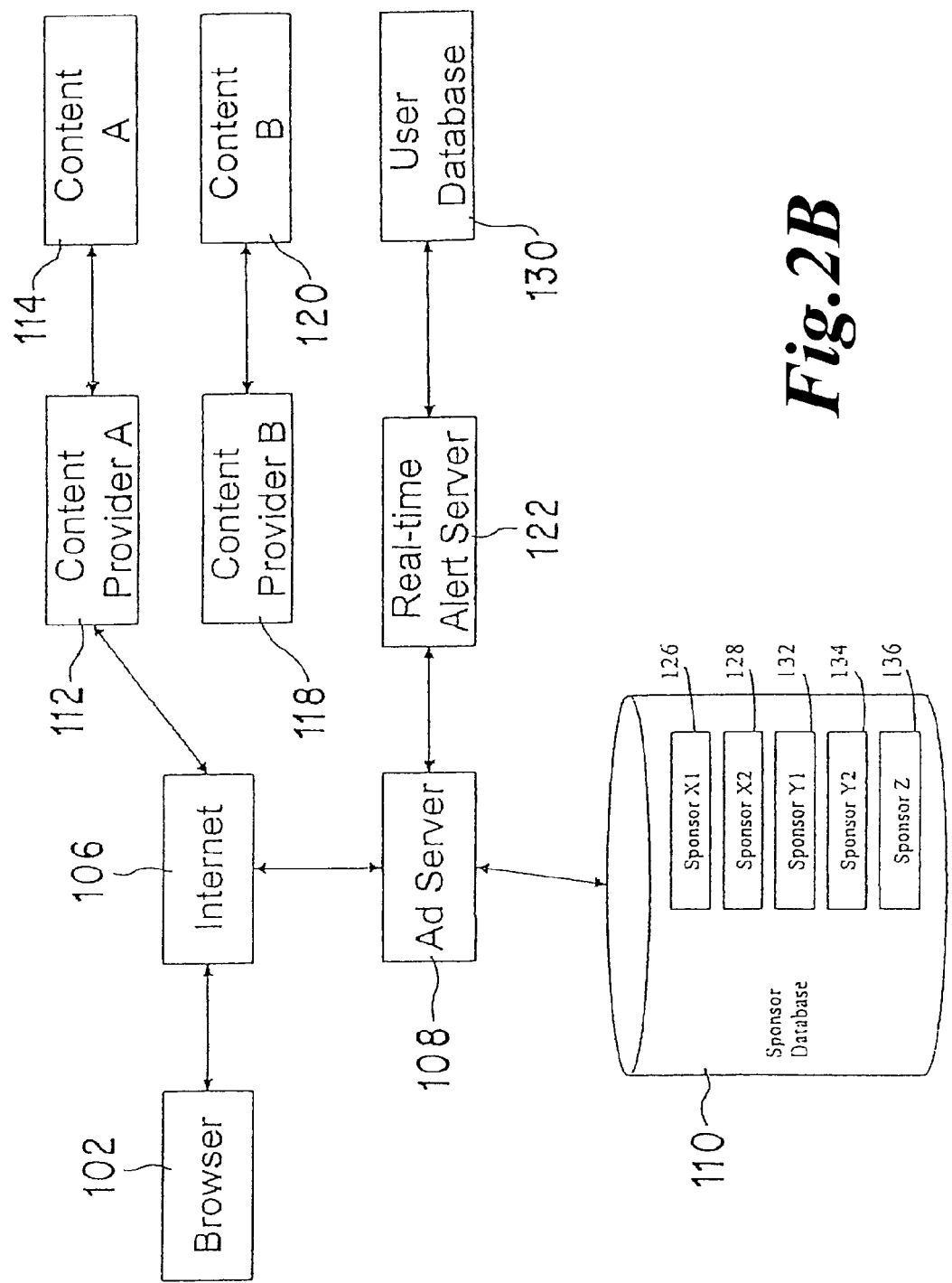
FIG. 2B shows another exemplary embodiment of a system of the present invention.

In another exemplary embodiment shown in FIG. 2B, a user (not shown) uses browser 102 to access Internet 106. Browser 102 may be any browser, such as Internet Explorer, Mozilla, Netscape Navigator, etc. Furthermore, the browser may run on any processor, such as an Intel Pentium Processor, an Apple processor, AMD, etc. Furthermore, the client device running the browser may be a desktop computer, a laptop, a PDA, a cell phone, watch, TV or any other device capable of connecting to the Internet.

Internet 106, in this example, provides the user access to content provider A 112 or content provider B 118. Content provider A provides a user with content A 114 and content provider B provides the user with content B 120.

After connecting to Internet 106, a desired web page (content A 114) is downloaded to browser 102 from content provider A 112. Web pages can include iFrames, or a floating frame inserted into a web page, which is associated with a tag used in web page design. Using an iFrame, a second HTML document can be embedded in a first HTML document. An example of the use of an iFrame is an advertisement that is seen on a side area of a web page.

When the user uses web browser 102 to download a web page that includes advertisements, the web browser is making a request for content and a request for an advertisement. For example, if the browser is receiving content A 114, the content includes a script, when accessed by the server causes the server to retrieve an advertisement from a remote ad server 108. In alternative embodiments, the ad server does not need to be remote. The ad server may be included in content provider A, or the information stored in the ad server 108 may be stored locally on the client device.

Server 108 is connected to DCA server 122, which accesses real time information that is useful for the user. This information may include stock quotes, sports scores, traffic information, weather information, emergency alerts (including natural disasters, terrorist attacks, and Amber alerts). Using the example of weather information, the information can be dynamic real-time information. By real-time, the information may be current as of one second and up to 15 minutes old. In the case of weather information data such as wind speed, pressure, temperature, wind direction, rate of rain fall, plus/minus one second is made possible by 8,000 WeatherBug™ Tracking Stations and more than 1,000 cameras primarily based at neighborhood schools and public safety facilities across the U.S. WeatherBug™ (a brand of AWS Convergence Technologies Inc.) maintains the largest exclusive weather network in the world.

For example if temperature for zip code 20878 is provide as the dynamic real-time information, the information is accurate as of one second to 15 minutes from when it is retrieved. In other embodiments, the temperature data is continuously refreshed on the browser so as to display dynamic real-time information to the user. However, the refresh rate can be modified so as to not interfere with the user's access to content 114.

In the example of weather alerts, server 108 retrieves dynamic real-time information from a variety of sources; the WeatherBug network, NWS and other $3^{rd}$ party content providers. The weather information can include temperature, wind speed, wind direction, humidity, pressure, rate of rain fall, amount of rain fall, severe weather alerts, pollen alerts, lightening, etc.

In one embodiment of the present invention, the dynamic real-time information is displayed in a 300×250 rich media advertising unit. However, any size advertising unit can be used. In another embodiment of the present invention, there is a sponsor for the dynamic real-time information. For example, a severe weather warning for zip code 20878 is displayed along with a message stating "brought to you by Company D."

The name of Company D shown in the advertisement may be a hyperlink. If the user clicks the hyperlink, the user's browser would retrieve information from the website of Company D. In another embodiment of the present invention, the website of Company D may provide the user with additional information regarding the dynamic real-time information included in the advertisement. Furthermore, this additional information is may be included in an iFrame, or on a fully hosted web site by either party, so as to have the ability to not obscure the information provided in Company D's website.

Figure 5:
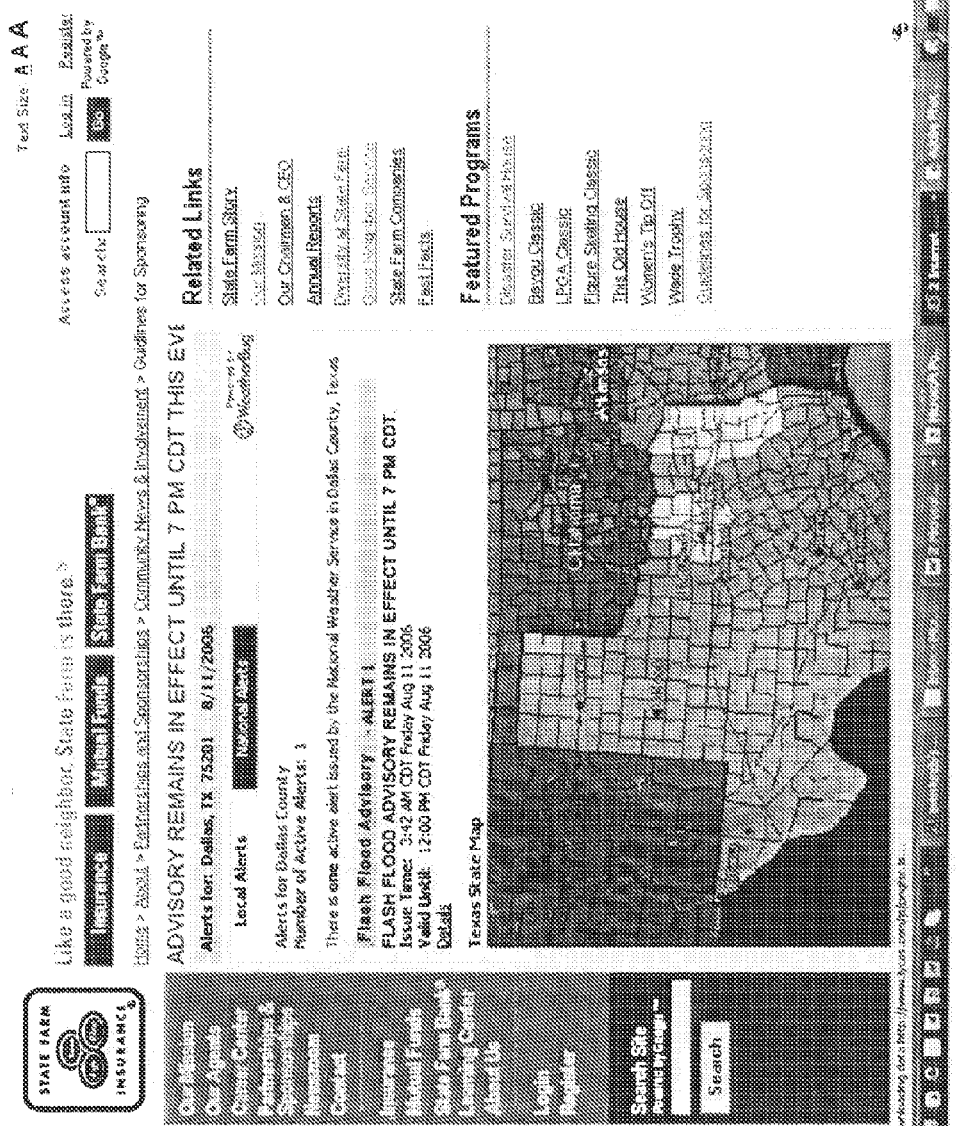
FIG. 5 is exemplary screen shot of web site of a sponsor.

FIG. 5 shows an example of a webpage served by Company D's website (in this example Company D is State Farm™). As shown in FIG. 5, the State Farm website provides the user with additional information about the severe weather alert included in the advertisement shown in FIGS. 3 and 4.

Whether the user clicks on the hyperlink in the advertisement, Company D, by sponsoring the advertisement, has created awareness of the event (the dynamic real-time information, which may be a severe weather alert). Furthermore, the user can now associate Company D as a provider of valuable information.

In the example using weather information, weather information for the geographical location of the user may be the most useful and valuable to the user. However, the user may also be interested in the weather for another locale (such as a work location, an alternate residence, a residence of a family member, vacation spot, etc. . . . ).

In an alternate embodiment of the present invention, the user may be registered with the system shown in FIG. 2B, and the system may store or retrieve a characteristic of the user, such as the user's name, zip code, location, a direct request for specific information, etc. Using the characteristic of the user, database 130 can be accessed by real-time alert server 122, so as to retrieve an alert location, type, or other alert parameters based on user preferences stored in database 130.

In addition, database 130 can include the type of information the user wants to see (i.e., weather, sports, stock information, etc.). The type of information the user wants to see can be stored in correspondence with the characteristic of the user. For example, if the characteristic is a zip code, the data base 130 can store instructions to provide all users in that particular zip code with real-time dynamic weather alerts and/or scores for the local sporting teams.

In another embodiment, server 108 combines dynamic real-time information obtained from DCA server 122 and advertisement sponsor database 110. In one embodiment, one sponsor is the exclusive sponsor of all alerts used in conjunction with content provider A or with the type of alerts (i.e., sponsor X1 sponsors all traffic alerts, sponsor X2 sponsors all weather alerts, sponsor X3 sponsors Amber alerts, etc). In another embodiment, the sponsors may be cycled through (i.e., each sponsor is used for one hour or based on specific alert types such as Winter Weather Advisories). In another embodiment, each sponsor only sponsors certain dynamic content type. In an example using weather information, if the dynamic real-time temperature information is displayed to the user, the sponsor is selected based on this data.

For example, server 108 executes the following logical process: if the temperature is above 90 degrees, then display sponsor X1 (a brand of a popular soft drink), if the temperature is below 70 degrees, then display sponsor X2 (an advertisement for weather stripping), and otherwise display sponsor X3 (an advertisement for clothing). Further, as noted above, the advertisement can be created dynamically.

Figure 6:
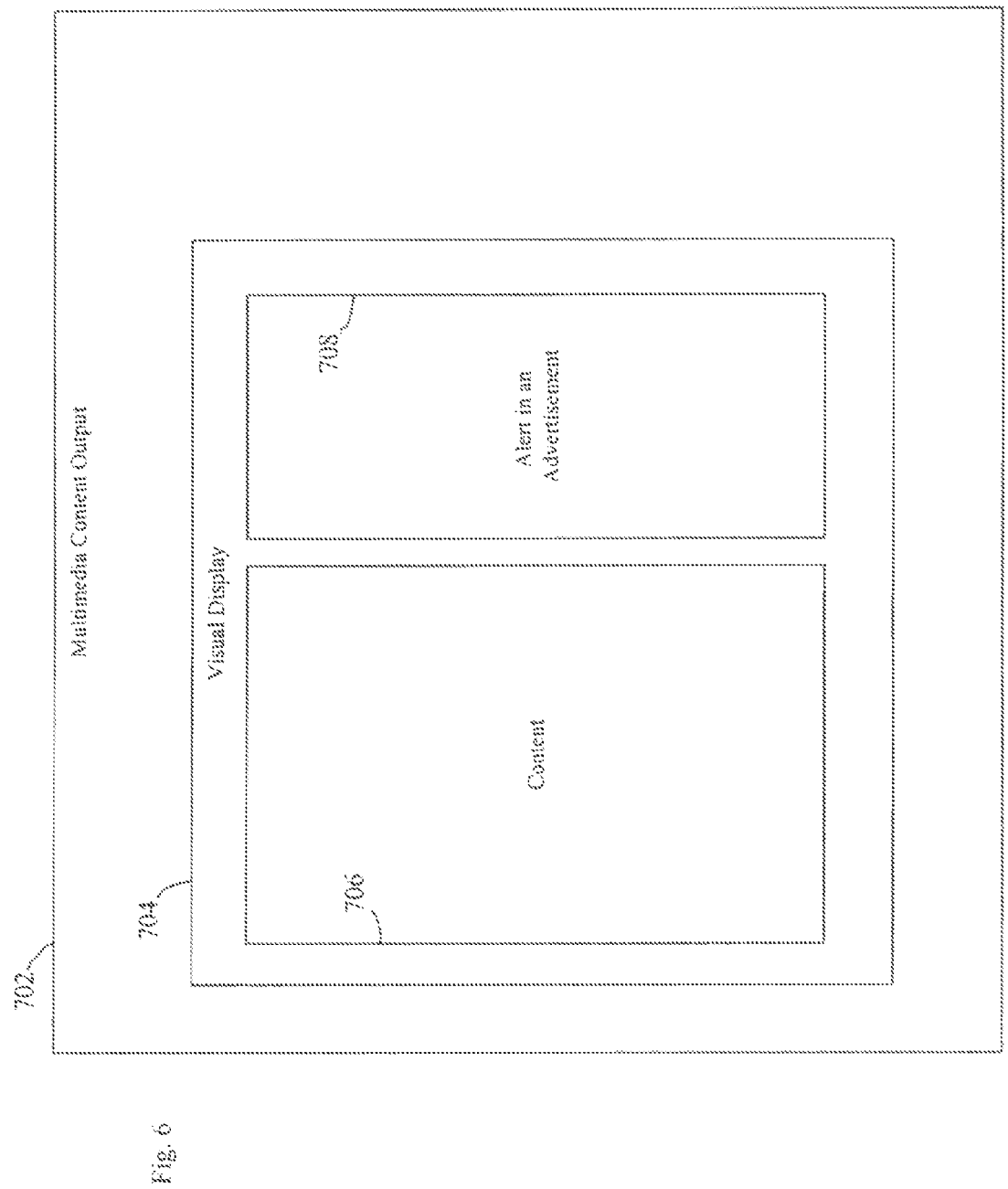
FIG. 6 is a block diagram of an embodiment of multimedia content output in the present invention.

FIG. 6 shows an example of a multimedia content output 702 according to an embodiment of the present invention. Multimedia content output 702 includes a visual display 704 (e.g., a browser window on a computer or a page in a magazine). The visual display 704 shows content 706 and an alert 708, which is included in an advertisement. Each of the content 706 and the alert 708 are visible on at least a portion of the visual display 704. In this example the content 706 is a content requested by a user and the alert 708 includes advertisement having dynamic real-time information and information pertaining to the sponsorship of the advertisement. The dynamic real-time information is information that is relevant to the user, and is selected in a manner as discussed above. Although the alert is shown as being separate from the content 706, one of skill in the art will know that an advertisement may be superimposed on the content, for example, as a window placed over the content, or a banner advertisement in an Internet page placed alongside or around the requested content. One example of such an advertising graphical user interface is described in U.S. patent application Ser. No. 09/813, 751, filed Mar. 21, 2001 entitled "Method for Enhancing the Effectiveness of Advertising Delivery Over Interactive Media", the entire contents of which is incorporated herein by reference.

Furthermore, as noted above, the alert can be displayed in other formats besides video, which include but are not limited to, text, audio, or graphics.

Figure 7:
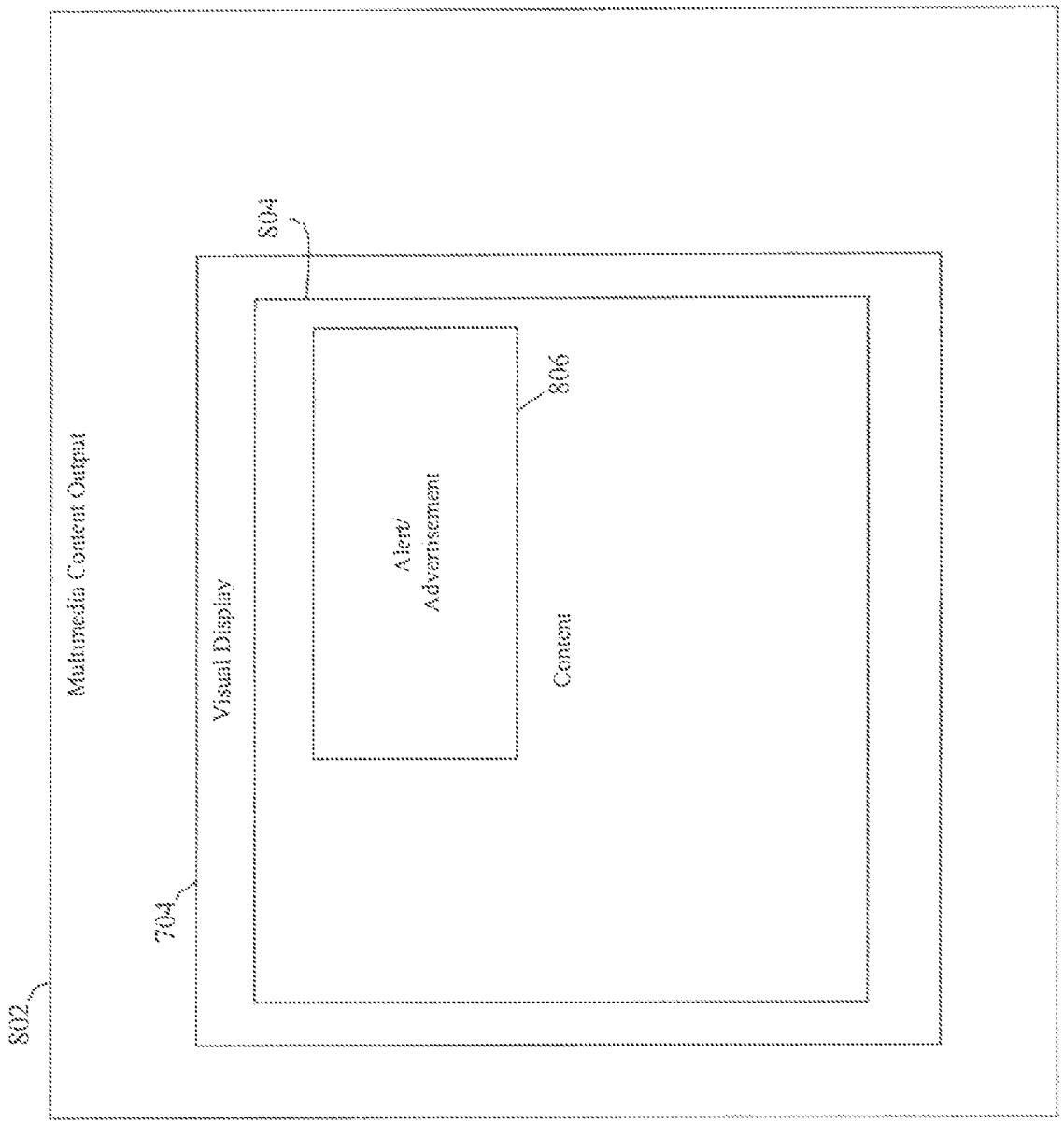
FIG. 7 is a block diagram of another embodiment of multimedia content output in the present invention.
Figure 8:
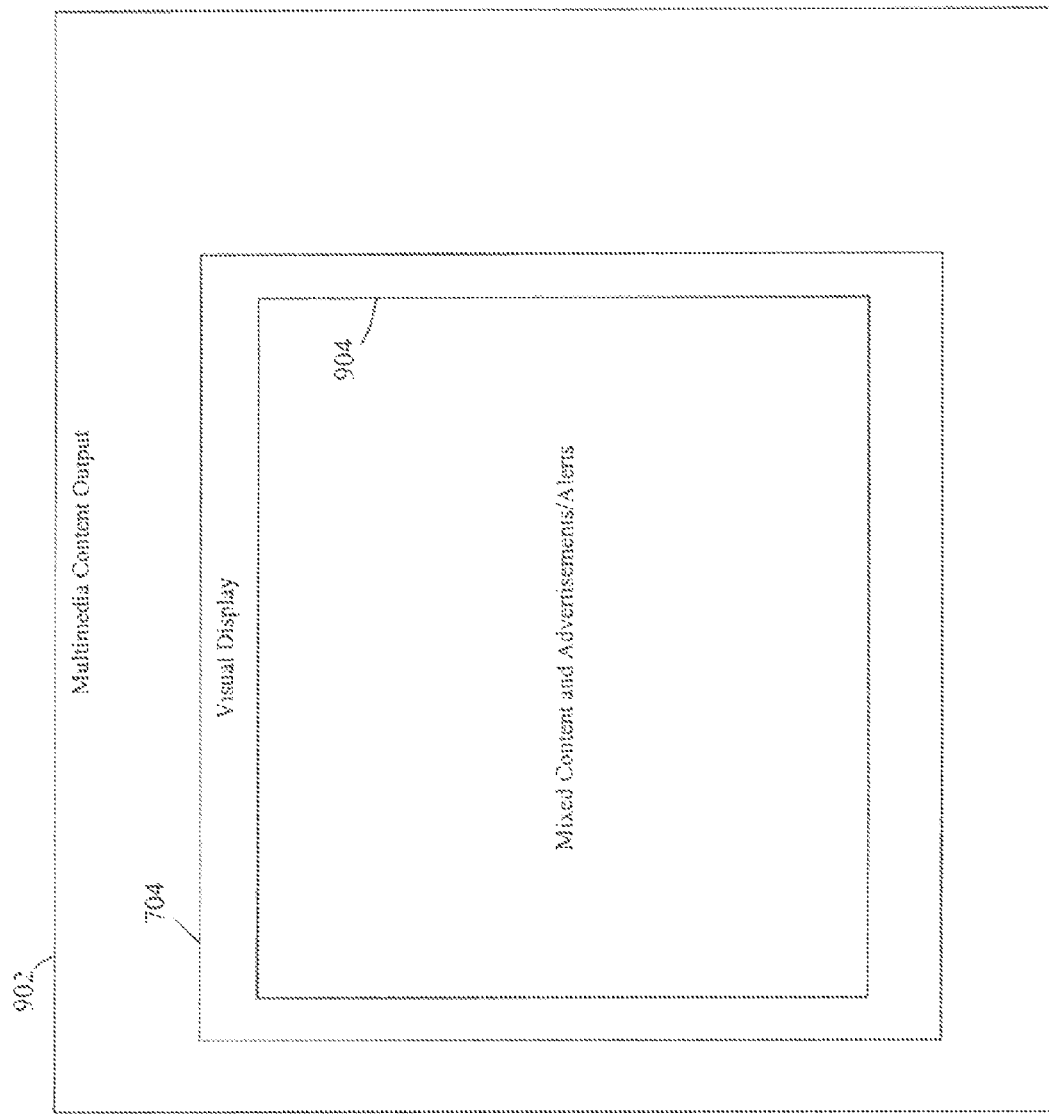
FIG. 8 is a block diagram of another embodiment of multimedia content output in the present invention.

As a further example, as shown, in FIG. 7, alert 806 may be superimposed over content 804. Alternatively, as shown in the example of FIG. 8, a mixed content and alert 904 may include both content and advertisements. Further, the display of content in advertisements is not limited to the examples shown and other possible combinations of advertisement and content are also included in the present invention.

In other embodiments of the present invention, real-time reporting and analytics can be generated overlaying the alert data, with other data such as population, location of power plants, nuclear facilities, etc.

Furthermore, the present invention is not limited to Internet based systems. For example, the present invention can be used in a satellite based system (such as a satellite phone system or a satellite television system) or a terrestrial broadcast system (i.e., television or radio). Furthermore, the digital content can be delivered using any digital system, and is not limited to HTML. Persons of ordinary skill in the art will recognized that any communication protocol can be used, including but not limited to EDXL (emergency data exchange language), XML (extensible markup language), and CAP (common alert protocol).

Figure 9:
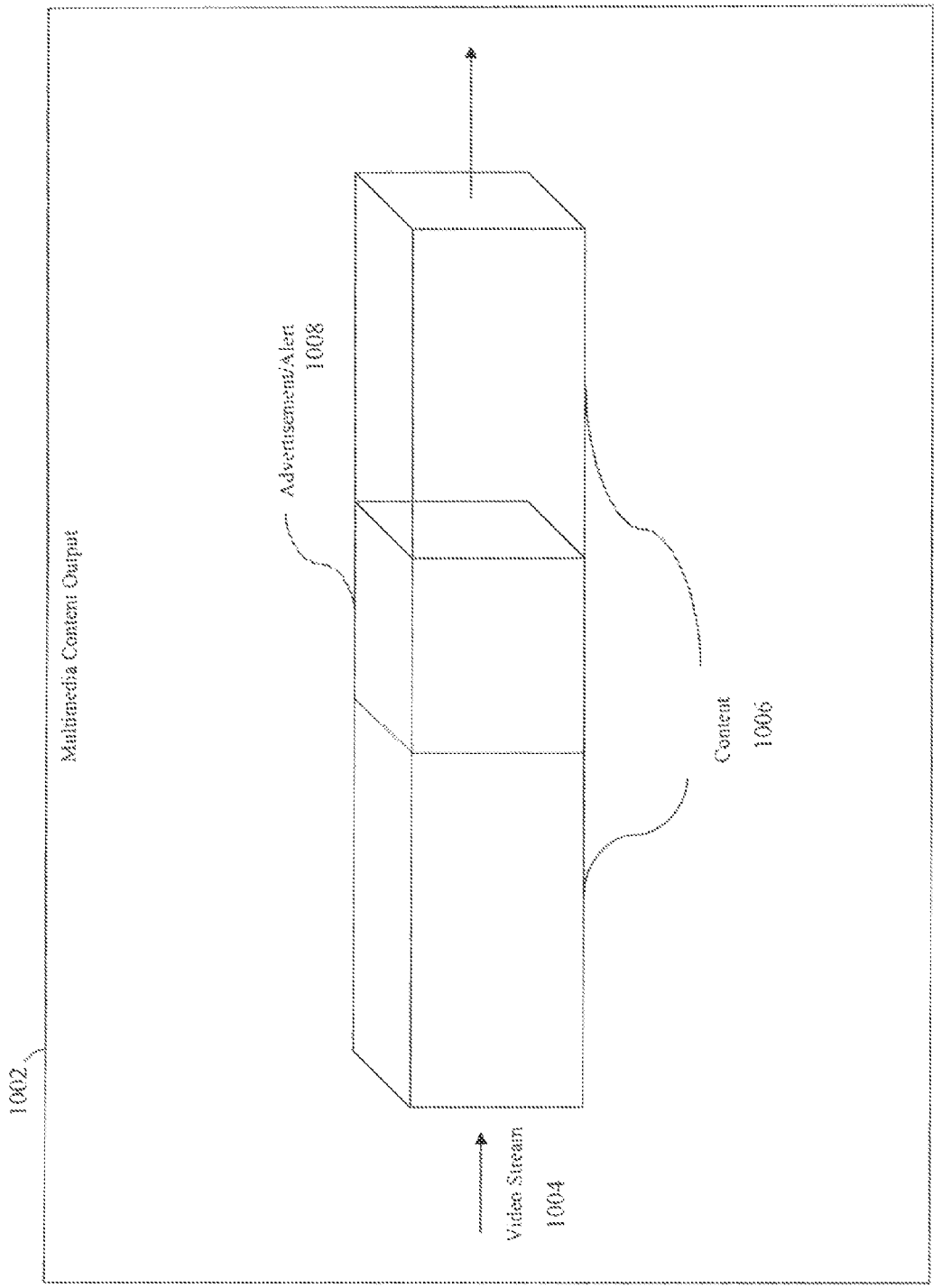
FIG. 9 is a block diagram of another embodiment of multimedia content output in the present invention.

FIG. 9 shows an example of a multimedia content output 1002 that presents a video stream 1004 to the user. Video stream 1004 includes content 1006 and alert 1008, which is included in an advertisement. Thus, in the present example, video frames of content 1006 are intermixed with video of alert 1008 (e.g., an advertising video).

For example, the multimedia content output 1002 may be an example of a video window or user's computer, and video stream 1004 may be the video content received over the Internet channel which includes a desired program (e.g., content 1006).

For example, a user may be identified using a radio signal scheme to identify the user to the multimedia content output device or by correlating a location of the user with a location of the multimedia content output device or by other means of associating a passerby/user with a particular multimedia content output. Alternatively, the multimedia content output 1002 may be an example of a portable device having a video and audio display, such as a PDA or portable computer or cell phone.

Figure 10:
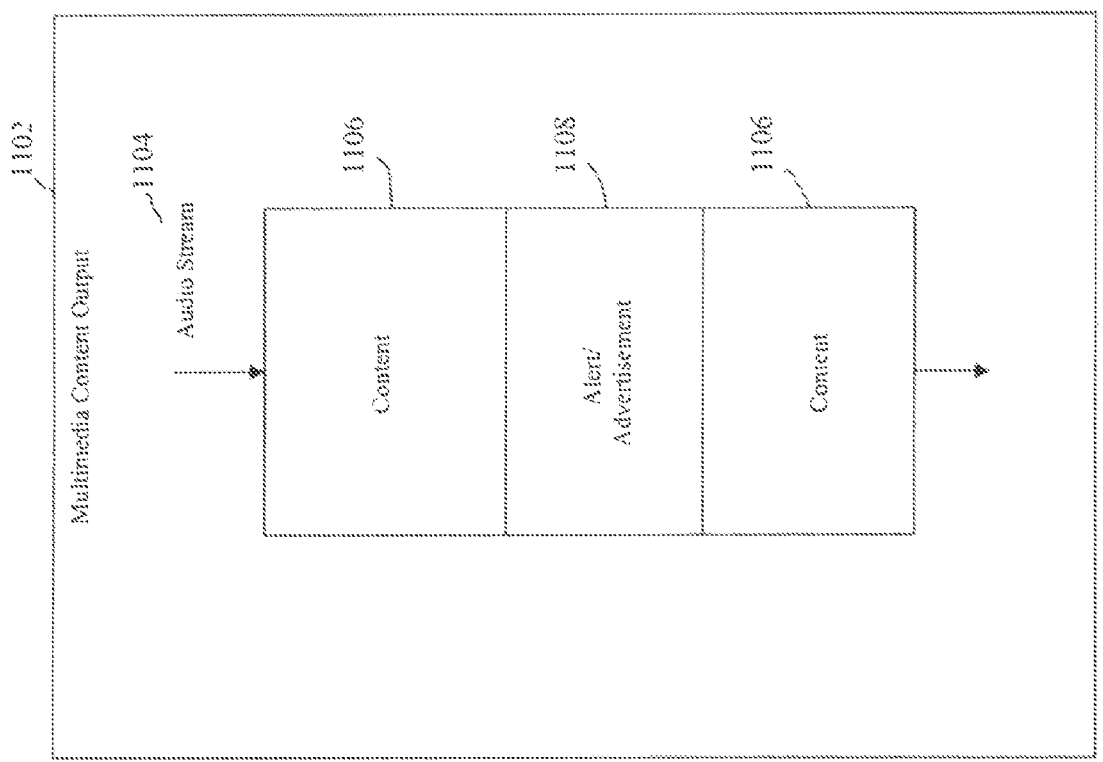
FIG. 10 is a block diagram of another embodiment of multimedia content output in the present invention.

FIG. 10 shows a further possible embodiment of a multimedia content output according to the present invention. In this example, multimedia content output 1102 presents an audio stream 1104 which includes audio content 1106 and audio alert 1108.

For example, the multimedia content output 1102 may be an example of a user's computer, and audio stream 1104 may be the video content received over the Internet radio channel which includes a desired program (e.g., content 1106).

In another embodiment, the multimedia content output 1102 may be a portable user radio listening device and audio stream 1104 may be an example of audio information broadcast from a particular terrestrial or satellite radio station. In addition, content 1106 may be an example of a particular audio program, for example a talk radio show, and alert 1108 may be an example of an audio advertisement presented during or in between breaks on the talk radio show.

Further, although multimedia content output examples are shown with visual display images, video streams and audio streams, a particular multimedia content output according to the present invention may include the presentation of combinations of these types of media as well as other types of media.

Figure 2D:
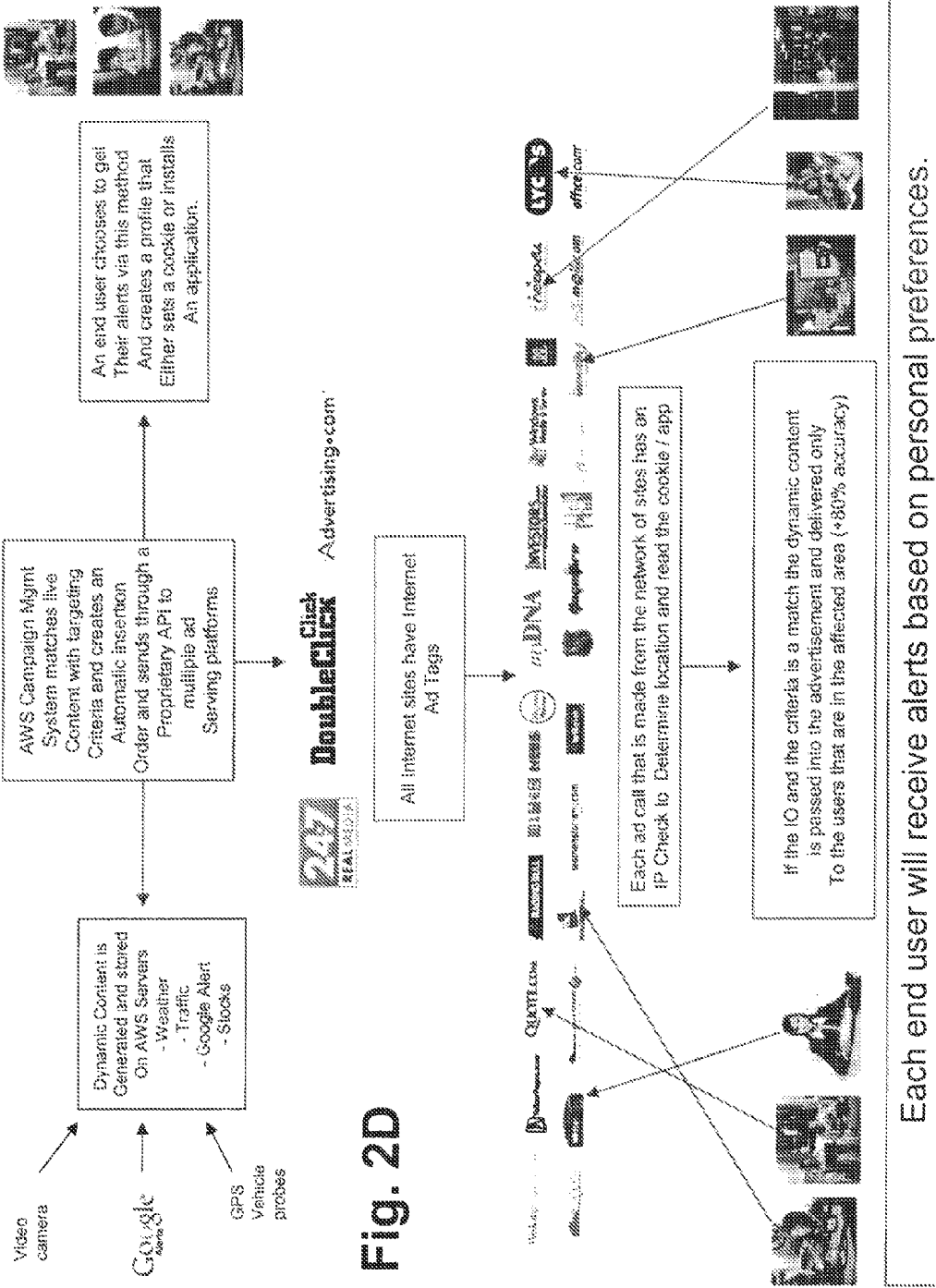
FIG. 2D shows a flow chart for an embodiment of the invention.

For example, the system shown in FIG. 2B can match DCA with targeting criteria and create an automatic insertion order. The automatic insertion order is sent through an API to one or more ad serving platforms, such as DoubleClick and Advertising.com. In this embodiment, an end use can create a profile that sets a cookie, installs an application, or through some other method, that manages user preferences. Each end user will receive alerts based on their personal preferences. FIG. 2D shows a flow of information between the components of FIG. 2B.

Figure 11:
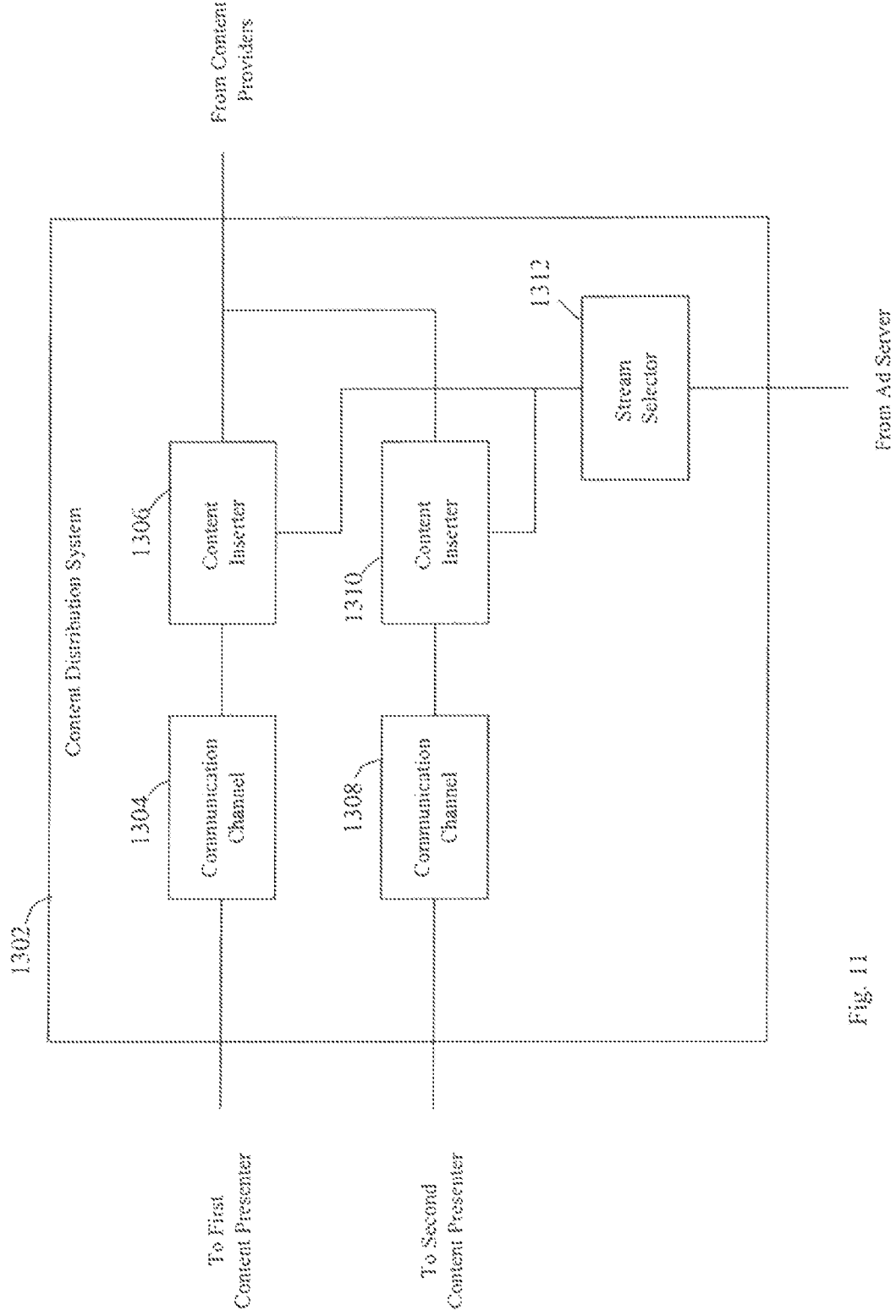
FIG. 11 is a block diagram of an embodiment of a content distribution system in the present invention.

FIG. 11 shows an embodiment of a content distribution system 1302. In the content distribution system 1302, content inserters 1306 and 1310 receive content from content providers and combine that content with an advertisement (including alert information) as indicated by stream selector 1312. Stream selector 1312 receives an advertisement/alert from an advertisement server. Stream selector 1312, in some embodiments, also receives sponsor information for the received advertisement/alert. The content and advertisement/alert (along with sponsor information) are combined and communicated to a content presenter (i.e., television, radio, cell phone, internet, PC, etc.) using communication channels 1304 and 1308.

If the user is registered, the advertisement/alert is constructed by having stream selector 1312 direct alert X1 and the sponsor information to content inserter 1306. Content inserter 1306 adds alert X1 and the corresponding sponsor information to the content that is distributed to the content presenter of the user via communication channel 1304.

Figure 12:
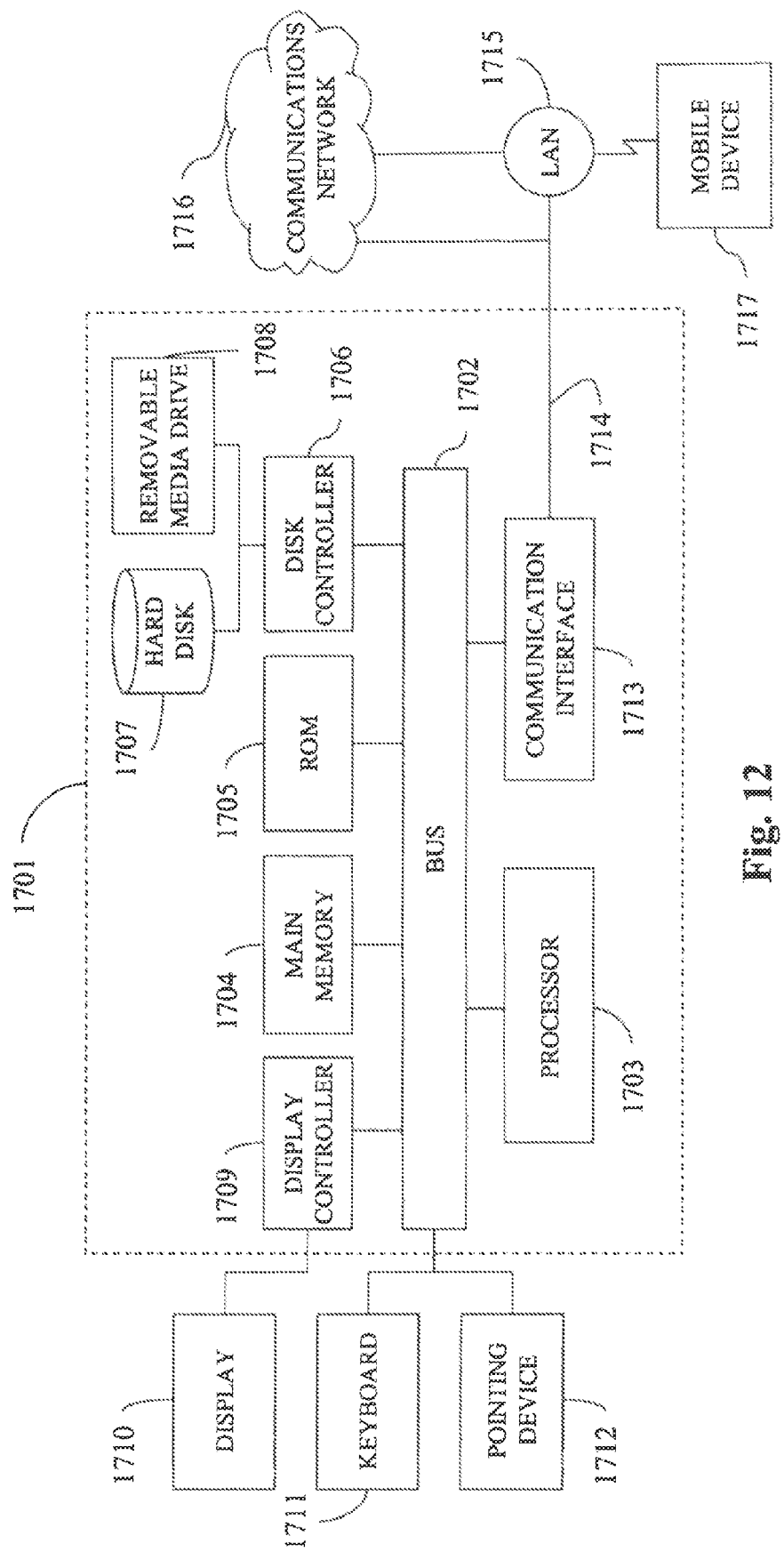
FIG. 12 is a block diagram of an embodiment of a computer used to implement the present invention.
Figure 13:
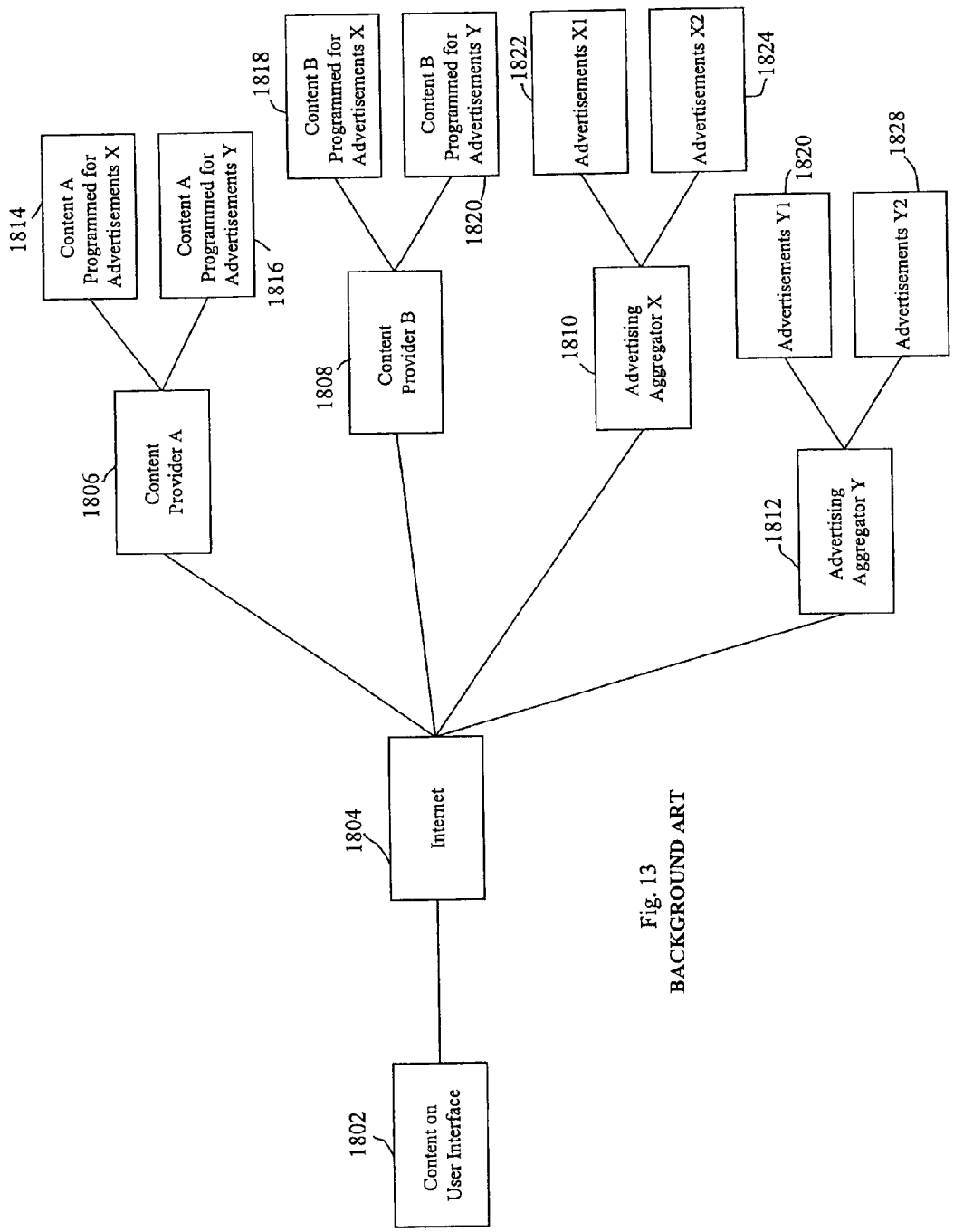
FIG. 13 is a block diagram of a conventional advertising system.

FIG. 12 illustrates a computer system 1701 upon which an embodiment of the present invention may be implemented. The computer system 1701 includes a bus 1702 or other communication mechanism for communicating information, and a processor 1703 coupled with the bus 1702 for processing the information. The computer system 1701 also includes a main memory 1704, such as a random access memory (RAM) or other dynamic storage device (e.g., dynamic RAM (DRAM), static RAM (SRAM), and synchronous DRAM (SDRAM)), coupled to the bus 1702 for storing information and instructions to be executed by processor 1703. In addition, the main memory 1704 may be used for storing temporary variables or other intermediate information during the execution of instructions by the processor 1703. The computer system 1701 further includes a read only memory (ROM) 1705 or other static storage device (e.g., programmable ROM (PROM), erasable PROM (EPROM), and electrically erasable PROM (EEPROM)) coupled to the bus 1702 for storing static information and instructions for the processor 1703.

The computer system 1701 also includes a disk controller 1706 coupled to the bus 1702 to control one or more storage devices for storing information and instructions, such as a magnetic hard disk 1707, and a removable media drive 1708 (e.g., floppy disk drive, read-only compact disc drive, read/write compact disc drive, compact disc jukebox, tape drive, flash memory drive, and removable magneto-optical drive). The storage devices may be added to the computer system 1701 using an appropriate device interface (e.g., small computer system interface (SCSI), integrated device electronics (IDE), enhanced-IDE (E-IDE), direct memory access (DMA), or ultra-DMA).

The computer system 1701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1701 may also include a display controller 1709 coupled to the bus 1702 to control a display 1710, such as a cathode ray tube (CRT), for displaying information to a computer user. The computer system includes input devices, such as a keyboard 1711 and a pointing device 1712, for interacting with a computer user and providing information to the processor 1703. The pointing device 1712, for example, may be a mouse, a trackball, or a pointing stick for communicating direction information and command selections to the processor 1703 and for controlling cursor movement on the display 1710. In addition, a printer may provide printed listings of data stored and/or generated by the computer system 1701.

The computer system 1701 performs a portion or all of the processing steps of the invention in response to the processor 1703 executing one or more sequences of one or more instructions contained in a memory, such as the main memory 1704. Such instructions may be read into the main memory 1704 from another computer readable medium, such as a hard disk 1707 or a removable media drive 1708. One or more processors in a multi-processing arrangement may also be employed to execute the sequences of instructions contained in main memory 1704. In alternative embodiments, hard-wired circuitry may be used in place of or in combination with software instructions. Thus, embodiments are not limited to any specific combination of hardware circuitry and software.

As stated above, the computer system 1701 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Alternatively, instructions programmed according to the teachings of the invention may be included in a carrier wave (described below), or any other medium from which a computer can read.

Stored on any one or on a combination of computer readable media, the present invention includes software for controlling the computer system 1701, for driving a device or devices for implementing the invention, and for enabling the computer system 1701 to interact with a human user (e.g., print production personnel). Such software may include, but is not limited to, device drivers, operating systems, development tools, and applications software. Such computer readable media further includes the computer program product of the present invention for performing all or a portion (e.g., locally portion of distributed processing) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed or centralized for better performance, reliability, and/or cost.

The term "computer readable medium" as used herein refers to any medium that participates in providing instructions to the processor 1703 for execution. A computer readable medium may take many forms, including but not limited to, non-volatile media, volatile media, and transmission media. Non-volatile media includes, for example, optical, magnetic disks, flash memory, and magneto-optical disks, such as the hard disk 1707 or the removable media drive 1708. Volatile media includes dynamic memory, such as the main memory 1704. Transmission media includes coaxial cables, copper wire and fiber optics, including the wires that make up the bus 1702. Transmission media also may also take the form of acoustic or light waves, such as those generated during radio wave and infrared data communications.

Various forms of computer readable media may be involved in carrying out one or more sequences of one or more instructions to processor 1703 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1701 may receive the data on the telephone line and use an infrared transmitter to convert the data to an infrared signal. An infrared detector coupled to the bus 1702 can receive the data carried in the infrared signal and place the data on the bus 1702. The bus 1702 carries the data to the main memory 1704, from which the processor 1703 retrieves and executes the instructions. The instructions received by the main memory 1704 may optionally be stored on storage device 1707 or 1708 either before or after execution by processor 1703.

The computer system 1701 also includes a communication interface 1713 coupled to the bus 1702. The communication interface 1713 provides a two-way data communication coupling to a network link 1714 that is connected to, for example, a local area network (LAN) 1015, or to another communications network 1716 such as the Internet. For example, the communication interface 1713 may be a network interface card to attach to any packet switched LAN. As another example, the communication interface 1713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1713 sends and receives electrical, electromagnetic or optical signals that carry digital data streams representing various types of information.

The network link 1714 typically provides data communication through one or more networks to other data devices. For example, the network link 1714 may provide a connection to another computer through a local network 1715 (e.g., a LAN) or through equipment operated by a service provider, which provides communication services through a communications network 1716. The local network 1714 and the communications network 1716 use, for example, electrical, electromagnetic, or optical signals that carry digital data streams, and the associated physical layer (e.g., CAT 5 cable, coaxial cable, optical fiber, etc). The signals through the various networks and the signals on the network link 1714 and through the communication interface 1713, which carry the digital data to and from the computer system 1701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1701 can transmit and receive data, including program code, through the network(s) 1715 and 1716, the network link 1714 and the communication interface 1713. Moreover, the network link 1714 may provide a connection through a LAN 1715 to a mobile device 1717 such as a personal digital assistant (PDA) laptop computer, or cellular telephone. Another embodiment of the present invention includes an alert advertisement creation engine configured to dynamically create interactive online advertisements to display alert information based on the weather targeting engine.

The advertisement creation engine may include a web interface tool configured to define advertising campaigns, their associated source of alerts, the copy for the design of the advertisement, and the executable hyperlink leading to the URL for the campaign.

The alert information feeds may include, but are not limited to, CAP (common alerting protocol), National Weather Service, AWS Smart Notification alerts, and Ad-hoc messages generated and sent to consumers who fit the campaign's alerting criteria.

This web interface tool may integrate with a weather targeting engine, and enable, disable, or modify advertising campaigns as the advertising campaigns' alert targeting criteria are compared to the alert feeds assigned to the advertising campaigns.

Figure 14:
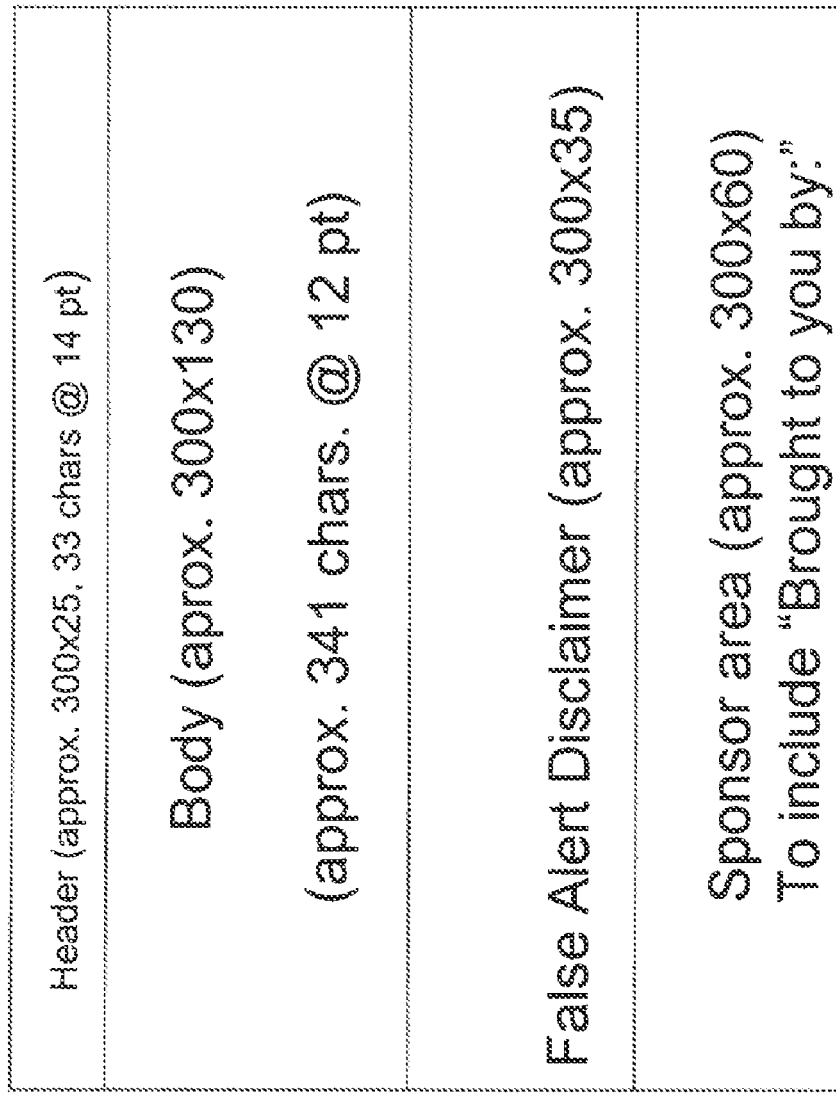
FIG. 14 is an example of a design of an advertisement.

In an embodiment of the present invention, the alert advertisement creation engine may create advertisements sized 300 pixels wide by 250 pixels high. FIG. 14 is an example of how an advertisement may be designed. The header of the advertisement may display information about the alert type, and may include approximately 33 or fewer characters at 14 point. The body of the advertisement may display full details of the alert message, to be approximately 300 pixels wide by 130 pixels high. The content in this section may include any dynamic content—text, graphics, audio, video, etc. The false alert disclaimer may include copy that includes a legal disclaimer regarding false alerts, or any other information. The false alert disclaimer section may include copy that takes up no more than approximately 300 pixels wide by 35 pixels high. The sponsor area may include text that says, "Brought to you by:" and branding for the sponsor for the alert advertisement. This section may be no larger than approximately 300 pixels wide by 60 pixels high. This section may include sponsor imagery.

Embodiments of the advertisement may be an executable HTML hyperlink, wherein the URL is defined in the advertisement's campaign set up process.

Numerous modifications and variations of the present invention are possible in light of the above teachings. It is therefore to be understood that within the scope of the appended claims, the invention may be practiced otherwise than as specifically described herein.

The invention claimed is:

1. A method of presenting content, comprising steps of:
receiving, at an advertisement server configured to provide advertisements included at designated locations within web pages, requests for advertisements to be inserted into the web pages based on ad tags provided to web browsers by content providers of the web pages;
in response to receiving a request for an advertisement at the advertisement server, contacting, by the advertisement server, an alert server;
determining, at the alert server, a geographic region of a web browsers sending the request for the advertisement to the advertisement server;
determining, at the alert server, whether an automatic insertion order stored at the alert server and the geographic region of the web browser sending the request for the advertisement are a match, and
in response to their being a match, transmitting, at the alert server, the automatic insertion order and a dynamic content alert to the advertisement server;
receiving, at the advertisement server, the dynamic content alert from the alert server for the geographic region and the automatic insertion order instructing the advertisement server to generate an advertisement that includes real-time information of the dynamic content alert for users of web browsers in the geographic region;
executing, at the advertisement server, the automatic insertion order, which includes,
dynamically generating the advertisement that includes the real-time information of the dynamic content alert for the geographic region and a sponsor of the advertisement, and
determining, at the advertisement server, locations of users of web browsers requesting advertisements and which of the users are located in the geographic region; and
transmitting, at the advertisement server, the advertisement that includes the real-time information of the dynamic content alert for the geographic region and the sponsor of the advertisement to the users of web browsers requesting advertisements from the advertisement server determined to be in the geographic region.

2. The method of claim 1, wherein the dynamic content alert is an environmental event that relates to at least one of temperature, wind direction, wind speed, barometric pressure, hurricanes, tornadoes, thunderstorms, flooding, rate of rain fall, NWS Alert, Amber Alert, DHS, DOT or FEMA Alert.

3. The method of claim 1, wherein the dynamic content alert is an environmental event that relates to traffic conditions, incidents and forecast.

4. The method of claim 1, wherein the dynamic content alert is an environmental event that occurs from 1 second to 15 minutes prior to receiving the notice.

5. The method of claim 1, wherein the advertisement includes one or more of real-time temperature, real-time wind speed, real-time wind direction, real-time barometric pressure, and real-time rate of rain fall, NWS Alerts, Amber Alerts, DHS, DOT and FEMA Alerts.

6. The method of claim 1, wherein the dynamically generating comprises:
accessing a database that stores sponsor information in correspondence with a characteristic of the real-time information of the dynamic content alert;
determining, based on information stored in the database, which sponsor corresponds with the real-time information; and
including the sponsor that was determined to correspond with the real-time information in the advertisement.

7. The method of claim 6, wherein the real-time information is information related to sports, information related to a financial market, or information related to weather.

8. The method of claim 1, further comprising:
causing the advertisement including the real-time information and the sponsor to be displayed in an iframe, wherein the real-time information and the sponsor are in a same iframe.

9. The method of claim 1, wherein the step of dynamically generating includes disposing a hyperlink to a website associated with the sponsor in the advertisement, wherein if the user activates the hyperlink, the browser retrieves information from the website associated with the sponsor.

10. The method of claim 9, wherein the website associated with the sponsor includes additional information regarding the dynamic content alert.

11. The method of claim 1, wherein the real-time information is a temperature and the dynamically generating further comprises:
selecting a first sponsor for the advertisement if the temperature is above a predetermined limit; and
selecting a second sponsor for the advertisement if the temperature is below the predetermined limit.

12. The method of claim 1, wherein the dynamically generating comprises:
generating a video stream that includes video content of the sponsor and the real-time information of the dynamic content alert intermixed with the video content of the sponsor.

13. The method of claim 1, wherein the dynamically generating comprises:
generating an audio stream that includes audio content of the sponsor and the real-time information of the dynamic content alert intermixed with the audio content of the sponsor.

14. A system for presenting content, comprising:
means for receiving requests for advertisements to be inserted into the web pages based on ad tags provided to web browsers by content providers of the web pages;
an alert server that determines a geographic region of a web browser sending the request for the advertisement, wherein the alert server determines whether an automatic insertion order stored at the alert server and the geographic region of the web browser sending the request for the advertisement are a match, and in response to their being a match, transmits the automatic insertion order and a dynamic content alert;
means for receiving the dynamic content alert from the alert server for the geographic region and the automatic insertion order instructing generation of an advertisement that includes real-time information of the dynamic content alert for users of web browsers in the geographic region;
means for executing, at the advertisement server, the automatic insertion order, which includes,
means for dynamically generating the advertisement that includes the real-time information of the dynamic content alert for the geographic region and a sponsor of the advertisement, and
means for determining, at the advertisement server, locations of users of web browsers requesting advertisements and which of the users are located in the geographic region; and
means for transmitting, at the advertisement server, the advertisement that includes the real-time information of the dynamic content alert for the geographic region and the sponsor of the advertisement to the users of web browsers requesting advertisements from the advertisement server determined to be in the geographic region.

15. The system of claim 14, wherein the dynamic content alert is an environmental event that relates to at least one of temperature, wind direction, wind speed, barometric pressure, hurricanes, tornadoes, thunderstorms, flooding, rate of rain fall, NWS Alert, Amber Alert, DHS, DOT or FEMA Alert.

16. The system of claim 14, wherein the dynamic content alert is an environmental event that relates to traffic conditions, incidents and forecast.

17. The system of claim 14, wherein the dynamic content alert is an environmental event that occurs from 1 second to 15 minutes prior to receiving the notice.

18. The system of claim 14, wherein the advertisement includes one or more of real-time temperature, real-time wind speed, real-time wind direction, real-time barometric pressure, and real-time rate of rain fall, NWS Alerts, Amber Alerts, DHS, DOT and FEMA Alerts.

19. The system of claim 14, wherein the means for executing further comprises:
- means for accessing a database that stores sponsor information in correspondence with a characteristic of the real-time information of the dynamic content alert;
- means for determining, based on information stored in the database, which sponsor corresponds with the real-time information;
- means for including the sponsor that was determined to correspond with the real-time information in the advertisement.

20. A non-transitory computer readable storage medium encoded with instructions, which when executed by a computer, causes the computer to implement a method of presenting content, comprising steps of:
- receiving, at an advertisement server configured to provide advertisements included at designated locations within web pages, requests for advertisements to be inserted into the web pages based on ad tags provided to web browsers by content providers of the web pages;
- in response to receiving a request for an advertisement at the advertisement server, contacting, by the advertisement server, an alert server;
- determining, at the alert server, a geographic region of a web browsers sending the request for the advertisement to the advertisement server;
- determining, at the alert server, whether an automatic insertion order stored at the alert server and the geographic region of the web browser sending the request for the advertisement are a match; and
- in response to their being a match, transmitting, at the alert server, the automatic insertion order and a dynamic content alert to the advertisement server;
- receiving, at the advertisement server, the dynamic content alert from the alert server for a geographic region and the automatic insertion order instructing the advertisement server to generate an advertisement that includes real-time information of the dynamic content alert for users of web browsers in the geographic region;
- executing, at the advertisement server, the automatic insertion order, which includes,
  - dynamically generating the advertisement that includes the real-time information of the dynamic content alert for the geographic region and a sponsor of the advertisement, and
  - determining, at the advertisement server, locations of users of web browsers requesting advertisements and which of the users are located in the geographic region; and
- transmitting, at the advertisement server, the advertisement that includes the real-time information of the dynamic content alert for the geographic region and the sponsor of the advertisement to the users of web browsers requesting advertisements from the advertisement server determined to be in the geographic region.

* * * * *